(12) United States Patent
Kawamoto

(10) Patent No.: US 12,159,306 B2
(45) Date of Patent: *Dec. 3, 2024

(54) SHOPPING SUPPORT DEVICE, SHOPPING SUPPORT SYSTEM, AND SHOPPING SUPPORT METHOD

(71) Applicant: Toshiba Tec Kabushiki Kaisha, Tokyo (JP)

(72) Inventor: Tsuyoshi Kawamoto, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,974

(22) Filed: Jul. 11, 2023

(65) Prior Publication Data

US 2023/0351476 A1 Nov. 2, 2023

Related U.S. Application Data

(63) Continuation of application No. 16/912,611, filed on Jun. 25, 2020, now Pat. No. 11,741,526.

(30) Foreign Application Priority Data

Aug. 22, 2019 (JP) .................................. 2019-152315

(51) Int. Cl.
*G06Q 30/00* (2023.01)
*G06K 19/06* (2006.01)
(Continued)

(52) U.S. Cl.
CPC ... *G06Q 30/0633* (2013.01); *G06K 19/06037* (2013.01); *G06Q 20/322* (2013.01);
(Continued)

(58) Field of Classification Search
CPC .............. G06Q 30/00; G06Q 30/0601; G06Q 30/0607; G06Q 30/0633; G06Q 30/0641
See application file for complete search history.

(56) References Cited

U.S. PATENT DOCUMENTS 10,032,154 B2 7/2018 Sambe
2005/0230472 A1 10/2005 Chang
(Continued)

FOREIGN PATENT DOCUMENTS

CN 1410929 A 4/2003
CN 106485489 A 3/2017
(Continued)

OTHER PUBLICATIONS

Lienbacher, Eva, et al. "Scan Performance of Barcodes at the Point of Sale (POS) in Food Retailing." EAERCD Conference, Valencia, Spanien. 2013. (Year: 2013).*
(Continued)

*Primary Examiner* — Christopher B Seibert
(74) *Attorney, Agent, or Firm* — Kim & Stewart LLP

(57) ABSTRACT

A shopping support device includes a memory, a reading device, a network interface, and a processor. The processor is configured to, upon reading of a first code with the reading device at a store, decode the first code and acquire and, then store in the memory, first and second parameter values, and then control the network interface to connect to a store network using the first parameter value. Upon the reading of a commodity ID for a commodity with the reading device, the commodity ID is transmitted to a store server via the store network for registration. Upon receipt of a request from a user, checkout processing is performed based on the registered commodity ID on the server and the second parameter value.

17 Claims, 11 Drawing Sheets

(51) Int. Cl.
  *G06Q 20/32*     (2012.01)
  *G06Q 30/0601*   (2023.01)

(52) U.S. Cl.
  CPC ..... *G06Q 20/3223* (2013.01); *G06Q 20/3276* (2013.01); *G06Q 30/0641* (2013.01)

(56)  References Cited

U.S. PATENT DOCUMENTS

| | | | |
|---|---|---|---|
| 2006/0004592 A1* | 1/2006 | Faith | A47F 10/00 345/173 |
| 2008/0197190 A1 | 8/2008 | Fujita et al. | |
| 2009/0322706 A1* | 12/2009 | Austin | G06F 3/038 345/175 |
| 2010/0030668 A1* | 2/2010 | Paben | G06Q 10/087 705/28 |
| 2012/0085828 A1* | 4/2012 | Ziegler | G09F 3/0335 235/494 |
| 2012/0284130 A1* | 11/2012 | Lewis | G06Q 40/00 705/16 |
| 2012/0284132 A1 | 11/2012 | Kim et al. | |
| 2012/0306655 A1* | 12/2012 | Tan | G06F 1/28 340/636.1 |
| 2013/0080289 A1* | 3/2013 | Roy | G06Q 20/322 705/26.8 |
| 2013/0218721 A1* | 8/2013 | Borhan | G06Q 30/02 705/26.41 |
| 2014/0244442 A1* | 8/2014 | Hirsch | G06Q 30/0625 705/26.7 |
| 2014/0337138 A1* | 11/2014 | Chitalia | G06K 19/06028 705/16 |
| 2014/0379532 A1* | 12/2014 | Agasti | G06Q 30/0643 705/27.1 |
| 2016/0086142 A1 | 3/2016 | Ando et al. | |
| 2017/0287056 A1* | 10/2017 | Dohlman | G06F 16/5838 |
| 2017/0316397 A1 | 11/2017 | Miyagi et al. | |
| 2018/0365666 A1 | 12/2018 | Kakino | |
| 2020/0104893 A1* | 4/2020 | Schubert | G06Q 20/203 |

FOREIGN PATENT DOCUMENTS

| | | |
|---|---|---|
| CN | 107403528 A | 11/2017 |
| CN | 107918986 A | 4/2018 |
| JP | 2003-022483 A | 1/2003 |
| JP | 2016-062376 A | 4/2016 |
| JP | 2018-195106 A | 12/2018 |
| JP | 2019-003438 A | 1/2019 |
| JP | 2020-042452 A | 3/2020 |
| WO | 2001/095185 A1 | 12/2001 |

OTHER PUBLICATIONS

Office Action mailed Jan. 10, 2024, in corresponding Chinese Patent Application No. 202010630784.1, 13 pages. (with translation).

Nseir, Sana, Nael Hirzallah, and Musbah Aqel. "A secure mobile payment system using QR code." 2013 5th International Conference on Computer Science and Information Technology. IEEE, 2013. (Year: 2013).

Tellkamp, Christian, et al. "The adoption of RFID-based self-checkout-systems at the point-of-sale: an empirical investigation." u Project E-Society: Building Bricks: 6th I FI P International Conference on e-Commerce, e-Business, and e-Government (I3E 2006) (Year: 2006).

Extended European Search Report mailed Feb. 2, 2021 in corresponding European Patent Application No. 20190020.6, 8 pages.

Office Action mailed Jun. 1, 2021 in corresponding Japanese Patent Application No. 2019-152315, 7 pages. (With translation).

Office Action mailed Oct. 3, 2023, in corresponding Japanese Patent Application No. 2021-146061, 8 pages. (with translation).

Examination Report mailed Apr. 10, 2024 in corresponding Indian Patent Application No. 202044034865, 5 pages.

* cited by examiner

FIG. 3

| No | SETTING ITEM | SETTING DATA |
|---|---|---|
| 1 | OPERATION VERSION | 1.0.0 |
| 2 | COMPANY CODE | 00001 |
| 3 | STORE CODE | 00001 |
| 4 | COMPANY NAME | XXX |
| 5 | STORE NAME | AAA |
| 6 | STORE ENTRY FLAG | 1or0 |
| 7 | IP ADDRESS | 111.222.1.1:9999 |
| 8 | CLOUD DOMAIN NAME | cloudname.jp |
| 9 | ELECTRONIC RECEIPT SERVER ADDRESS | www.receipt.jp |
| 10 | IN-STORE LAN FLAG | 1or0 |
| 11 | IN-STORE LAN (SSID) | Store.nnn |
| 12 | IN-STORE LAN (PASSWORD) | 1234567890 |
| 13 | IN-STORE LAN (SECURITY METHOD) | 1or2or3 |
| 14 | CLOUD REQUISITE FLAG | 1or0 |
| 15 | STATUS TRANSMISSION MODE | 1or2or3 |
| 16 | LOG TRANSMISSION MODE | 1or2or3 |
| 17 | FTP (HOST NAME) | 111.222.1.1 |
| 18 | FTP (USER NAME) | ftpuser |
| 19 | FTP (PASSWORD) | ftppass |
| 20 | FTP (LOG FOLDER PATH) | c:¥log¥ |
| 21 | UPC CHECK DIGIT DELETION FLAG | 1or0 |
| 22 | CAMERA SCREEN AUTOMATIC TRANSITION TIME | 30000ms |
| 23 | MOBILE COMMUNICATION TIMEOUT PERIOD | 2000ms |
| 24 | NUMBER OF MOBILE COMMUNICATION RETRIES | 1 |
| 25 | CLOUD COMMUNICATION TIMEOUT PERIOD | 3000ms |
| 26 | NUMBER OF CLOUD COMMUNICATION RETRIES | 1 |
| 27 | BARCODE VALUE FOR CLERK CONFIRMATION WARNING CANCELLATION | 0123456789 |
| 28 | OPERATION MODE | 1or2 |
| 29 | CHECKOUT MACHINE TRANSFER MODE | 1or2 |
| 30 | CODE PAYMENT OPERATION FLAG | 1or0 |
| 31 | COMPULSORY FLAG FOR ADULT COMMODITIES | 1or0 |
| 32 | POINT CARD INPUT MODE | 1or2 |
| 33 | CLERK SETTING IMPORT FLAG | 1or0 |
| 34 | BATTERY CHECK THRESHOLD | 20 |

SHOPPING SUPPORT DEVICE, SHOPPING SUPPORT SYSTEM, AND SHOPPING SUPPORT METHOD

CROSS-REFERENCE TO RELATED APPLICATION

This application is a continuation of U.S. patent application Ser. No. 16/912,611, filed Jun. 25, 2020, which is based upon and claims the benefit of priority from Japanese Patent Application No. 2019-152315, filed on Aug. 22, 2019, the entire contents of which are incorporated herein by reference.

FIELD

Embodiments described herein relate generally to a shopping support device, a shopping support system, and a shopping support method.

BACKGROUND

Shopping support systems are known, which allow customers by themselves to register commodities to be purchased by operating terminals to read identification codes attached to the commodities when selecting the commodities at a store.

In such shopping support systems, a store may lend a user terminal to a customer. For example, the store provides a shopping cart to which the user terminal has been attached so that a customer operates the user terminal to read an identification code of a commodity when putting the commodity into the shopping cart for purchase. In such a case, since the user terminal is owned and maintained by the store, configuration necessary for the user terminal to perform self-service registration can be set in advance.

In other systems, it is possible that the customer may use a communication terminal owned the customer, such as a customer's personal smartphone, for self-service registration. When the customer's personally owned communication terminal is used as the user terminal, such a device may be required to operate at several different stores with similar but distinct commodity sales processing systems installed.

However, in such a shopping support system, for example, when an identification code of a commodity is read by the personal communication terminal, the identification code needs to be transmitted to a store server for subsequent checkout process. Therefore, it is required for the communication terminal to know configuration parameters for communicating with the store server.

In general, different parameters are set for store servers operated at or for different stores or companies. For example, network parameters including a timeout period or the number of retries to be attempted when a connection error occurs vary depending on the particular network to which each store server is connected. Therefore, there are cases where the communication terminal cannot acquire such parameters in advance and the communication terminal must be brought into the particular store. Additionally, the customer may need to manually set the parameters in the communication terminal by himself or herself. Thus, there is a need for a system that simplifies the configuration procedure required for those self-service registration systems that use the customer's own communication terminal.

DESCRIPTION OF THE DRAWINGS

FIG. 3 is a schematic diagram showing a data structure of a store setting table.

DETAILED DESCRIPTION

One or more embodiments provide a shopping support device and method allowing a personal communication terminal to be used as a user terminal of a shopping support system introduced in a plurality of stores without complicated setting work.

In general, according to one embodiment, a shopping support device includes a memory, a reading device, a network interface, and a processor. The processor is configured to, upon reading of a first code with the reading device, decode the first code to acquire, and store in the memory, first and second parameter values. The processor then controls the network interface to connect to a store network using the first parameter value. When a commodity ID for a commodity is read with the reading device, the processor controls the network interface to transmit the commodity ID via the store network to a server for registration. The processor is configured to perform checkout processing, based on the registered commodity ID, upon receipt of a request from a user of the shopping support device. The checkout processing is performed in accordance with the second parameter value.

Hereinafter, various example embodiments of a shopping support device will be described with reference to the drawings.

In an embodiment, a communication terminal such as a smartphone owned by a customer is used as a user terminal in a shopping support system available at a plurality of different stores.

Figure 1:
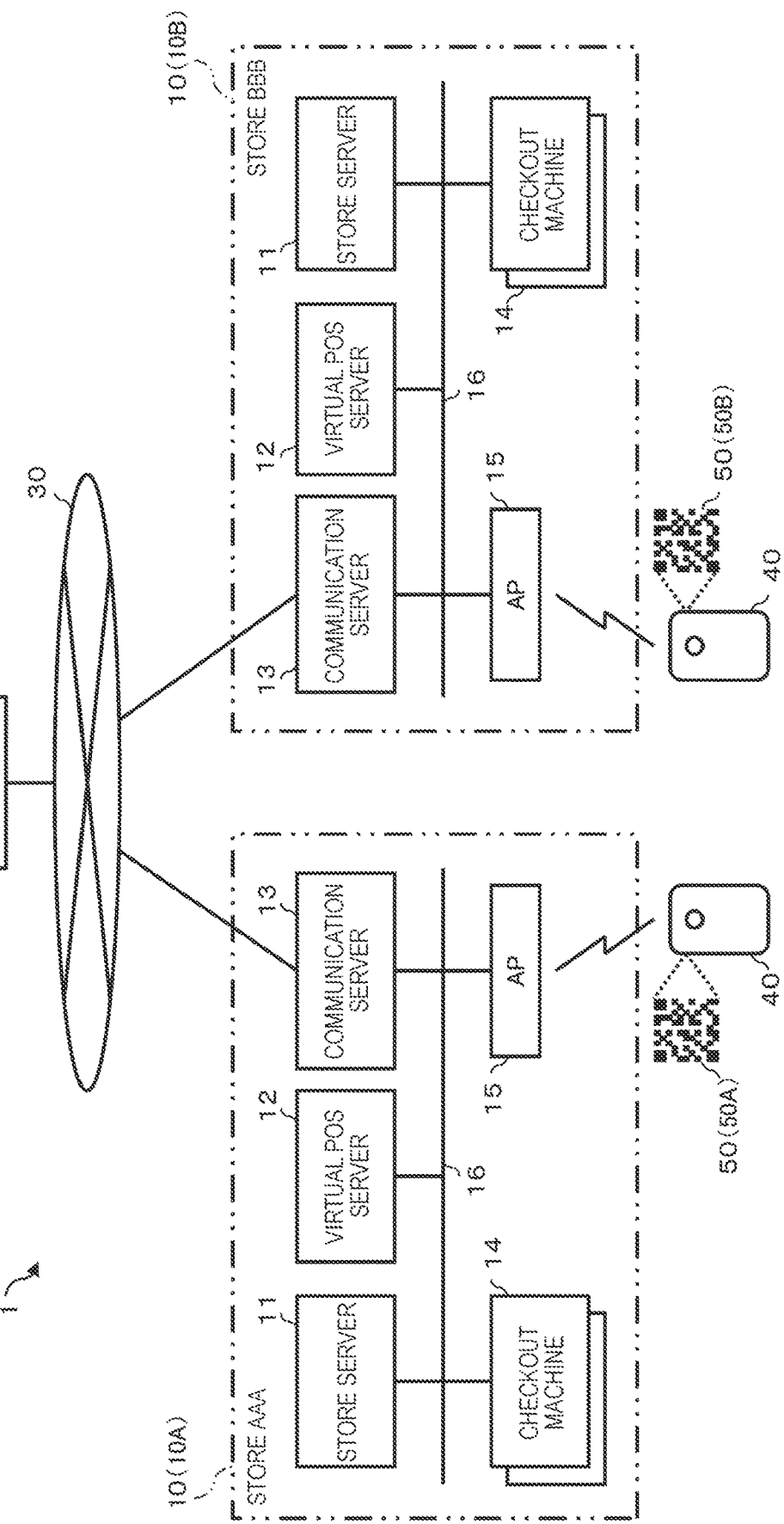
FIG. 1 is a schematic diagram of a shopping support system according to an embodiment.

FIG. 1 is a schematic diagram of a shopping support system 1 according to an embodiment. The shopping support system 1 includes a plurality of store systems 10, a relay server 20, a network 30, and a user terminal 40.

Each store system 10 is particularly configured for the store at which the shopping support system 1 has been introduced and adopted. The number of stores at which the shopping support system 1 can be introduced is not particularly limited, but FIG. 1 depicts two stores as an example. FIG. 1 shows a store system 10 configured in a store AAA and a store system 10 configured in a store BBB. The company that operates the store AAA may be the same as or different from the company that operates the store BBB. Hereinafter, the store system of the store AAA is referred to as a store system 10A, and the store system of the store BBB is referred to as a store system 10B. The store systems 10A and 10B of the stores are collectively referred to as store systems 10.

The basic configurations of the store systems 10A and 10B are the same. That is, as shown in FIG. 1, each of the store systems 10A and 10B includes a store server 11, a virtual point-of-sale (POS) server 12, a communication server 13, a checkout machine 14, and an access point (AP) 15, and the above components are connected by a wired local area network (LAN) 16.

In this example, the store server 11 is a computer that supports all store operations. For providing this support, the store server 11 manages various databases including a commodity database. The commodity database is an aggregate of commodity records describing data of each commodity being sold in the store. That is, the commodity database managed by the store server 11 of the store system 10A stores the commodity records related to commodities sold at the store AAA. The commodity database managed by the store server 11 of the store system 10B stores the commodity records related to commodities sold in the store BBB. The commodity record includes commodity data such as a commodity code, a price, and a commodity name. The commodity code is a unique identification code set for each commodity in order to identify each commodity. Each commodity is usually provided with a barcode that represents or otherwise corresponds to the commodity code for the commodity.

In this example, the virtual POS server 12 is a computer that cooperates with the user terminal 40 to perform self-service registration in a manner similar to that would be available via a standard POS terminal. For example, the virtual POS server 12 has the following three functions. The first function is a function to register sales data of a commodity identified by a commodity code input via the user terminal 40 for each terminal ID identifying a different user terminal 40. The second function is a function to generate a registration screen based on sales data of each commodity registered for each terminal ID and to display the registration screen on the display device of the user terminal 40 specified by the terminal ID. The third function is a function to generate checkout data based on sales data of each commodity registered for each user terminal 40 when the checkout is instructed from the user terminal 40, and to transfer the generated checkout data to the store server 11.

The communication server 13 is a server for supporting data communication performed with the relay server 20 connected via the network 30.

The checkout machine 14 is a terminal for settling a registered commodity. The checkout machine 14 obtains checkout data from the store server 11, and performs settlement based on the checkout data. The settlement method is not particularly limited. Well-known settlement methods such as cash settlement, credit card settlement, electronic money settlement, reward points settlement, code settlement (also referred to as mobile settlement or smartphone settlement) can be used.

The checkout machine 14 may also have a function permitting registering of commodities in a standard manner. For example, when a barcode of a commodity is read by a scanner connected to the checkout machine 14, the checkout machine 14 makes an inquiry to the store server 11 using the commodity code represented by the barcode. The store server 11 responds to the inquiry with the commodity data, such as the commodity name and price of the commodity corresponding to the commodity code, so that the checkout machine 14 can register the sales data of a commodity being purchased based on the received commodity data. Then, the checkout machine 14 performs settlement processes for the registered commodity. Alternatively, the checkout machine 14 performs settlement processing by adding the sales data of the registered commodity to the checkout data acquired from the store server 11.

Such checkout machines 14 may be a conventional checkout machine in which a clerk inputs information for settlement, or a self-service checkout machine in which a customer inputs information for settlement. The store system 10 may include both such a conventional checkout machine and a self-service checkout machine, or may include only one type of the checkout machine. As a manned checkout machine, a conventional POS terminal from the related art can be adopted in some examples. As a self-service checkout machine, a conventional self-service checkout or semi-self-service checkout machine of the related arts might be adopted in some examples.

The access point 15 is communication equipment installed in the store as a relay device when each server (the store server 11, the virtual POS server 12, the communication server 13, and the like) of the store system 10 performs data communication with the user terminal 40 via a wireless LAN. The wireless LAN conforms to, for example, the Wi-Fi® standard. In FIG. 1, only one access point 15 is shown in one store system 10, but the number of the access points 15 is not limited. A plurality of access points 15 may be connected to the wired LAN 16 depending on the size of the store or the like.

The relay server 20 is installed in a cloud computing environment and connected to the communication server 13 of each of the store systems 10A and 10B via the network 30. The network 30 is, for example, a wide area network (WAN) using a virtual private network (VPN). The relay server 20 can be connected to the user terminal 40 via a WAN such as the Internet or a mobile communication network. Thus, the relay server 20 has a function of relaying data communication between the connected user terminal 40 and each of the store systems 10A and 10B.

The user terminal 40 is a portable communication terminal used by a customer in the shopping support system 1 at a plurality of stores. Although the details will be described later, the user terminal 40 has hardware for reading at least a two-dimensional data code 50. For example, a commercially available smartphone or tablet terminal equipped with a digital camera can be used as the user terminal 40. In an embodiment, a communication terminal such as a smartphone that the customer personally owns is used as the user terminal 40.

The data code 50 is prepared for each store. The data code 50 is provided, for example, at each of the entrance and the exit of the store. The data code 50 is generated by encoding setting information specific to a store or a company operating the store to a two-dimensional code. Each item of the setting information differs depending on the store. In this disclosure, the data code 50 of the store AAA is represented as a data code 50A, and the data code 50 of the store BBB is represented as a data code 50B. The data codes 50A and 50B of the stores AAA and BBB are collectively referred to as the data code 50.

Figure 2:
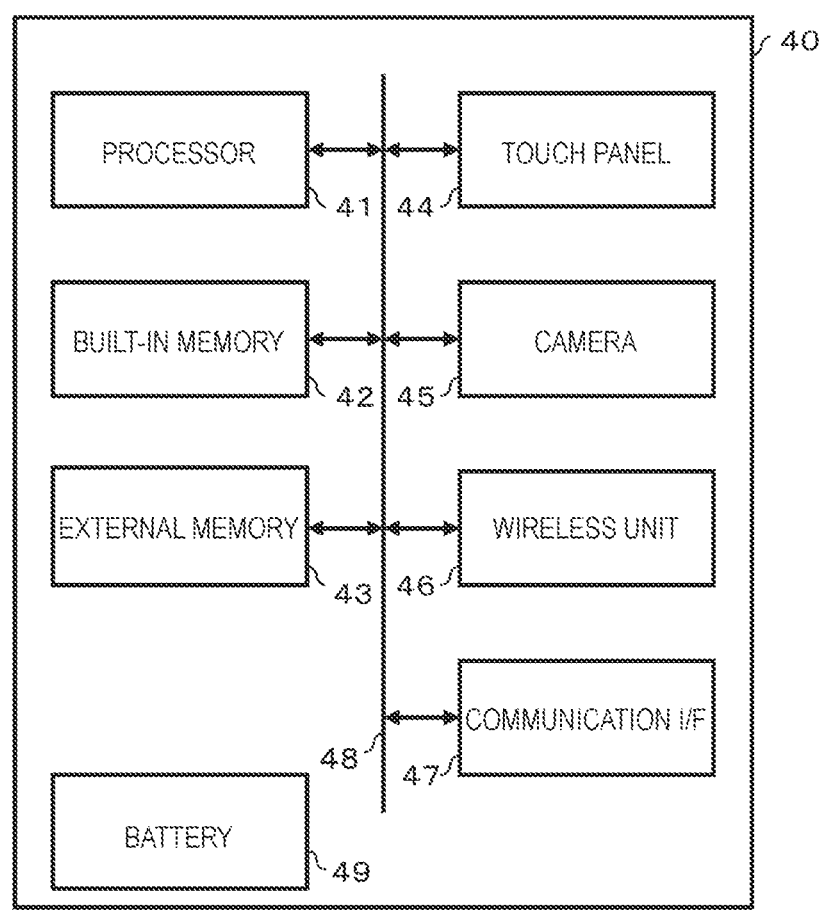
FIG. 2 is a block diagram of a user terminal.

FIG. 2 is a block diagram of the user terminal 40. As shown in FIG. 2, the user terminal 40 includes a processor 41, a built-in memory 42, an external memory 43, a touch panel 44, a camera 45, a wireless unit 46, a communication interface (I/F) 47, and a system transmission line 48. The user terminal 40 has a rechargeable battery 49.

The system transmission line 48 is, for example, an address bus, a data bus, a control signal line, or the like. In the user terminal 40, the processor 41, the built-in memory 42, the external memory 43, the touch panel 44, the camera 45, the wireless unit 46, and the communication interface 47 are connected via the system transmission line 48.

The processor 41 controls each unit of the user terminal 40 to perform various functions according to an operating system or an application program. The processor 41 is, for example, a central processing unit (CPU).

The built-in memory 42 includes a nonvolatile memory area and a volatile memory area. The built-in memory 42 stores an operating system or an application program in the nonvolatile memory area. The built-in memory 42 stores data necessary for the processor 41 to execute processing for controlling each unit in the volatile memory area. The built-in memory 42 uses the volatile memory area as a work area in which data is rewritten by the processor 41. The nonvolatile memory area is, for example, a read only memory (ROM). The volatile memory area is, for example, a random access memory (RAM).

The external memory 43 is an auxiliary storage device such as an SD memory card, a USB memory, or the like. The external memory 43 stores data used when the processor 41 performs various processes, data created by the process of the processor 41, and the like. The external memory 43 may store the application program described above.

The touch panel 44 is a device including both an input device and a display device of the user terminal 40. The touch panel 44 detects a touch position on the displayed image and outputs the touch position information to the processor 41.

The camera 45 is an imaging device built in the user terminal 40. The camera 45 operates as a photographing device of still images or motion images or as a scanning device of data codes such as a barcode or a two-dimensional code by an application program installed in the user terminal 40.

The wireless unit 46 is a circuit for performing data communication with the access point 15 according to a wireless LAN communication protocol.

The communication interface 47 is a circuit for performing data communication with the relay server 20 connected via the Internet or a mobile communication network.

The user terminal 40 having such a configuration stores, as an application program stored in the built-in memory 42 or the external memory 43, a shopping support program used during shopping at a store where the shopping support system 1 is installed. The method of installing the shopping support program in the built-in memory 42 or the external memory 43 is not particularly limited. The shopping support program can be installed in the built-in memory 42 or the external memory 43 from a removable recording medium, such as an SD memory card or a USB memory, or another computer via a network.

The user terminal 40 includes a store setting table 60 (see FIG. 3) referred to by the processor 41 when performing the shopping support program. The store setting table 60 is stored in the external memory 43. The store setting table 60 may be stored in the volatile area of the built-in memory 42.

FIG. 3 is a schematic diagram showing a data structure of the store setting table 60. As shown in FIG. 3, the store setting table 60 includes a first field F1 of serial numbers, a second field F2 of setting items, and a third field F3 of setting data. In the first field F1, serial numbers from No. 1 to No. 34 are described. In the second field F2, 34 types of setting items are described in association with the serial numbers No. 1 to No. 34, respectively. In the third field F3, the data of the setting items associated with the serial numbers No. 1 to No. 34 are described. The data of the setting items is represented by the data code 50 described above. That is, the user terminal 40 reads the data code 50A of the store AAA with the camera 45 to acquire the data of each setting item related to the store AAA and described in the third field F3 of the store setting table 60. The user terminal 40 reads the data code 50B of the store BBB with the camera 45 to acquire the data of each setting item related to the store BBB and described in the third field F3 of the store setting table 60.

The setting item corresponding to the serial number No. 1 is an operation version, e.g., the version of the shopping support program. Typically, the latest version of the shopping support program is encoded in the data codes 50A and 50B.

The setting item corresponding to the serial number No. 2 is a company code. A company code for identifying the company that operates the store AAA is encoded in the data code 50A, and a company code for identifying the company that operates the store BBB is encoded in the data code 50B.

The setting item corresponding to the serial number No. 3 is a store code. A store code for identifying the store AAA is encoded in the data code 50A, and a store code for identifying the store BBB is encoded in the data code 50B.

The setting item corresponding to the serial number No. 4 is a company name. The name of the company that operates the store AAA is encoded in the data code 50A, and the name of the company that operates the store BBB is encoded in the data code 50B.

The setting item corresponding to the serial number No. 5 is a store name. The name of the store AAA is encoded in the data code 50A, and the name of the store BBB is encoded in the data code 50B.

As described above, the third field F3 of the setting data corresponding to the serial numbers No. 2 to No. 5 of the store setting table 60 indicates information for identifying the store where the customer uses the user terminal 40 to shop. That is, the data code 50 representing the store-specific setting information includes information for identifying the store where the customer uses the user terminal 40 to shop.

The setting item corresponding to the serial number No. 6 is a store entry flag. The store entry flag is 1-bit data for identifying whether the data code 50 is provided at the entrance of the store or the data code 50 is provided at the exit. In an embodiment, in the data code 50 provided at the entrance, "1" is encoded as the store entry flag, and in the data code 50 provided at the exit, "0" is encoded as the store entry flag.

The setting item corresponding to the serial number No. 7 is an IP address of the communication server 13. The IP address of the communication server 13 provided in the store AAA is encoded in the data code 50A, and the IP address of the communication server 13 provided in the store BBB is encoded in the data code 50B.

The setting item corresponding to the serial number No. 8 is a cloud domain name of the relay server 20. The domain name of the relay server 20 is encoded in each of the data code 50A and the data code 50B.

The setting item corresponding to the serial number No. 9 is a domain name or an IP address of an electronic receipt server. The electronic receipt server is a server that provides a service for providing an electronic receipt, which is a computerized receipt, to a customer terminal (i.e., the user terminal 40). The domain name of the electronic receipt server used by the store AAA is encoded in the data code 50A, and the domain name of the electronic receipt server used by the store BBB is encoded in the data code 50B.

The setting item corresponding to the serial number No. 10 is an in-store LAN flag. The in-store LAN flag is 1-bit data for identifying whether to use the in-store wireless LAN as a communication medium between the user terminal 40 and the store system 10. In an embodiment, "1" is set when the store that uses the in-store wireless LAN, and "0" is set when the store does not use the in-store wireless LAN.

The setting item corresponding to the serial number No. 11 is a service set identifier (S SID) of the in-store LAN. The SSID, which is an identifier of the access point 15 provided in the store AAA, is encoded in the data code 50A, and the SSID of the access point 15 provided in the store BBB is encoded in the data code 50B.

The setting item corresponding to the serial number No. 12 is a password for the user terminal 40 to connect to the in-store LAN. The password for the wireless LAN of the store AAA is encoded in the data code 50A, and the password for the wireless LAN of the store BBB is encoded in the data code 50B.

The setting item corresponding to the serial number No. 13 is an encryption protocol used in the in-store LAN (security method). An identifier to indicate an encryption protocol, such as WPA2-PSK, WPA-PSK, WEP, and the like, used in the wireless LAN of the store AAA is encoded in the data code 50A, and an identifier to indicate an encryption protocol used in the wireless LAN of the store BBB is encoded in the data code 50B.

The setting item corresponding to the serial number No. 14 is a cloud requisite flag. The cloud requisite flag is 1-bit data for identifying whether the user terminal 40 continues operations even when it fails to connect to the relay server 20. In an embodiment, "1" is encoded as the cloud requisite flag when the user terminal 40 stops the operations due to such a connection error, and, "0" is encoded as the cloud requisite flag when the user terminal 40 continues the operations regardless of the error.

The setting item corresponding to the serial number No. 15 is a status transmission mode. The status transmission mode includes a first mode for transmitting the status of the user terminal 40 to the relay server 20, a second mode for transmitting the status to the store system 10, and a third mode for not transmitting the status. In the data code 50 of the store using the first mode, "1" is encoded as the status transmission mode, and in the data code 50 of the store using the second mode, "2" is encoded as the status transmission mode. In the data code 50 of the store using the third mode, "3" is encoded as the status transmission mode.

The setting item corresponding to the serial number No. 16 is a log transmission mode. The log transmission mode includes a first mode in which a log file accumulating log data of the user terminal 40 is transmitted only to the relay server 20, a second mode in which the log file is transmitted only to the store system 10, a third mode in which the log file is transmitted to both the relay server 20 and the store system 10, and a fourth mode for not transmitting the log file. In the data code 50 of the store using the first mode, "1" is encoded as the log transmission mode, and in the data code 50 of the store using the second mode, "2" is encoded as the log transmission mode. In the data code 50 of the store using the third mode, "3" is encoded as the log transmission mode, and in the data code 50 of the store using the fourth mode, "4" is encoded as the log transmission mode.

The setting item corresponding to the serial number No. 17 is a host name or an IP address of a file transfer protocol (FTP) server, e.g., the relay server 20. When the log transmission mode is the first mode or the third mode, the log file is transmitted to the relay server 20 via the Internet. The host name or IP address of the FTP server is encoded in the data code 50.

The setting item corresponding to the serial number No. 18 is a user name to be used to login the FTP server. In the data code 50, the user name to be used to login the ftp server to upload the log file is encoded.

The setting item corresponding to the serial number No. 19 is a password to be used to login the FTP server. In the data code 50, the password to be used to login the FTP server to upload the log file is encoded.

The setting item corresponding to the serial number No. 20 is a path to a log folder for storing log data about the FTP communication. In the data code 50, the path to the log folder in the FTP server to which the log file is to be transmitted to via the Internet is encoded.

As described above, the parameters required for the user terminal 40 to perform communication are set in the third field F3 of the setting data corresponding to the serial numbers No. 7 to No. 20 in the store setting table 60. That is, the data code 50 representing the store-specific setting information includes parameters required for the user terminal 40 to perform communication.

The setting item corresponding to the serial number No. 21 is a universal product code (UPC) check digit deletion flag. The UPC check digit deletion flag is 1-bit data for identifying whether to delete a check digit of a UPC which is a kind of commodity code. In an embodiment, in the data code 50 provided in the store that deletes the check digit in its operations, "1" is encoded as the UPC check digit deletion flag, and in the data code 50 provided in the store that does not delete the check digit in its operations, "0" is encoded as the UPC check digit deletion flag.

The setting item corresponding to the serial number No. 22 is a camera automatic transition time of the user terminal 40. The automatic transition time of the camera 45 is set for each store. That is, the camera automatic transition time set in the store AAA is encoded in the data code 50A of the store AAA, and the camera automatic transition time set in the store BBB is encoded in the data code 50B of the store BBB.

The setting item corresponding to the serial number No. 23 is a mobile communication timeout period to be set for the user terminal 40 to communicate with the store system 10 via the wireless LAN. The mobile communication timeout period to be set in the store AAA is encoded in the data code 50A of the store AAA, and the mobile communication timeout period to be set in the store BBB is encoded in the data code 50B of the store BBB.

The setting item corresponding to the serial number No. 24 is the number of mobile communication retries to be made by the user terminal 40 to communicate with the store system 10 via the wireless LAN when a timeout occurs. The number of mobile communication retries to be set in the store AAA is encoded in the data code 50A of the store AAA, and the number of mobile communication retries to be set in the store BBB is encoded in the data code 50B of the store BBB.

The field of the setting item corresponding to the serial number No. 25 is a cloud communication timeout period to be set to the user terminal 40 to communicate with the store system 10 via the relay server 20. The cloud communication timeout period to be set in the store AAA is encoded in the data code 50A of the store AAA, and the cloud communication timeout period to be set in the store BBB is encoded in the data code 50B of the store BBB.

The setting item corresponding to the serial number No. 26 is the number of cloud communication retries to be made by the user terminal 40 to communicate with the store system 10 via the relay server 20 when a timeout occurs. That is, the number of cloud communication retries to be set in the store AAA is encoded in the data code 50A of the store AAA, and the number of cloud communication retries to be set in the store BBB is encoded in the data code 50B of the store BBB.

The setting item corresponding to the serial number No. 27 is a barcode value for cancelling a clerk confirmation warning. For example, when a customer purchases an adult commodity, such as an alcoholic beverage and cigarette, the clerk confirmation warning is displayed on the user terminal 40. Such a warning can be cancelled after the clerk confirms the age of the customer and the user terminal 40 reads a particular barcode presented by the clerk. In the data code 50A, the particular barcode value used by the store AAA is encoded, and in the data code 50B, the particular barcode value used by the store BBB is encoded.

The setting item corresponding to the serial number No. 28 is an operation mode. The operation mode includes a normal mode in which the shopping support system is normally operated and a demo mode in which the shopping support system is operated as a demonstration. In the data code 50 used in the normal mode, "1" is encoded as the operation mode, and in the data code 50 used in the demo mode, "0" is encoded as the operation mode.

The setting item corresponding to the serial number No. 29 is a checkout machine transfer mode. In the store system 10, the sales data of the commodity obtained by reading the commodity code with the user terminal 40 is registered in the virtual POS server 12. Then, when the customer instructs checkout from the user terminal 40, the checkout data generated based on the sales data of the commodity registered in the virtual POS server 12 is transmitted to the checkout machine 14 via the store server 11. Here, as a method of transmitting the checkout data to the checkout machine 14, there are a method using a checkout barcode linked to the checkout data and a method not using the checkout barcode. In the data code 50 in the store using the checkout barcode, "1" is encoded as the checkout machine transfer mode, and in the data code 50 in the store not using the checkout barcode, "0" is encoded as the checkout machine transfer mode.

The setting item corresponding to the serial number No. 30 is a code payment operation flag. A code settlement method is one of payment settlement methods for purchased commodities. The code settlement method is a method of electronically paying for a commodity using the user terminal 40 and using a barcode or a two-dimensional code. The code payment operation flag is 1-bit data for identifying whether to accept such a code settlement method. In an embodiment, in the data code 50 of the store that accepts the code settlement method, "1" is encoded as the code payment operation flag, and in the data code 50 of the store that does not accept the code settlement method, "0" is encoded as the code payment operation flag.

The setting item corresponding to the serial number No. 31 is a compulsory flag for adult commodities. Whether to permit the user terminal 40 to register commodities with age restrictions, such as alcoholic beverages and cigarettes, is determined by the store. The compulsory flag for adult commodities is 1-bit data for identifying whether to permit the user terminal 40 to register such adult commodities. In an embodiment, "1" is set as the compulsory flag for a store to permit registration of adult commodities by the user terminal 40, and "0" is set as the compulsory flag for a store not to permit the registration.

The setting item corresponding to the serial number No. 32 is a point card input mode. The point card input mode includes a first mode in which the card number is manually input and a second mode in which the data code printed on the card is read by the camera 45 of the user terminal 40. In the data code 50 of the store using the first mode, "1" is encoded as the point card input mode, and in the data code 50 of the store using the second mode, "2" is encoded as the point card input mode.

The setting item corresponding to the serial number No. 33 is a clerk setting import flag. The clerk setting import flag is 1-bit data and indicates whether to require a clerk's confirmation when a customer manually inputs the card identification information of the point card. In an embodiment, in the data code 50 of the store that requires such a confirmation by a clerk, "1" is encoded as the clerk setting import flag, and in the data code 50 of the store that does not require the confirmation by a clerk, "0" is encoded as the clerk setting import flag.

The setting item corresponding to the serial number No. 34 is a battery check threshold. A battery check threshold is set for each store or company so that the user terminal 40 does not run out of battery during shopping. If the remaining battery is below the threshold, the customer is instructed to charge the user terminal 40 before shopping. The battery check threshold set by the store AAA is encoded in the data code 50 of the store AAA, and the battery check threshold set by the store BBB is encoded in the data code 50 of the store BBB.

As described above, in each field of the serial numbers No. 22 to No. 34 of the store setting table 60, information related to restriction of the use of the user terminal 40 at the store is set. That is, the data code 50 representing the store-specific setting information includes restriction information when the user terminal 40 is used at the store.

Figure 4:
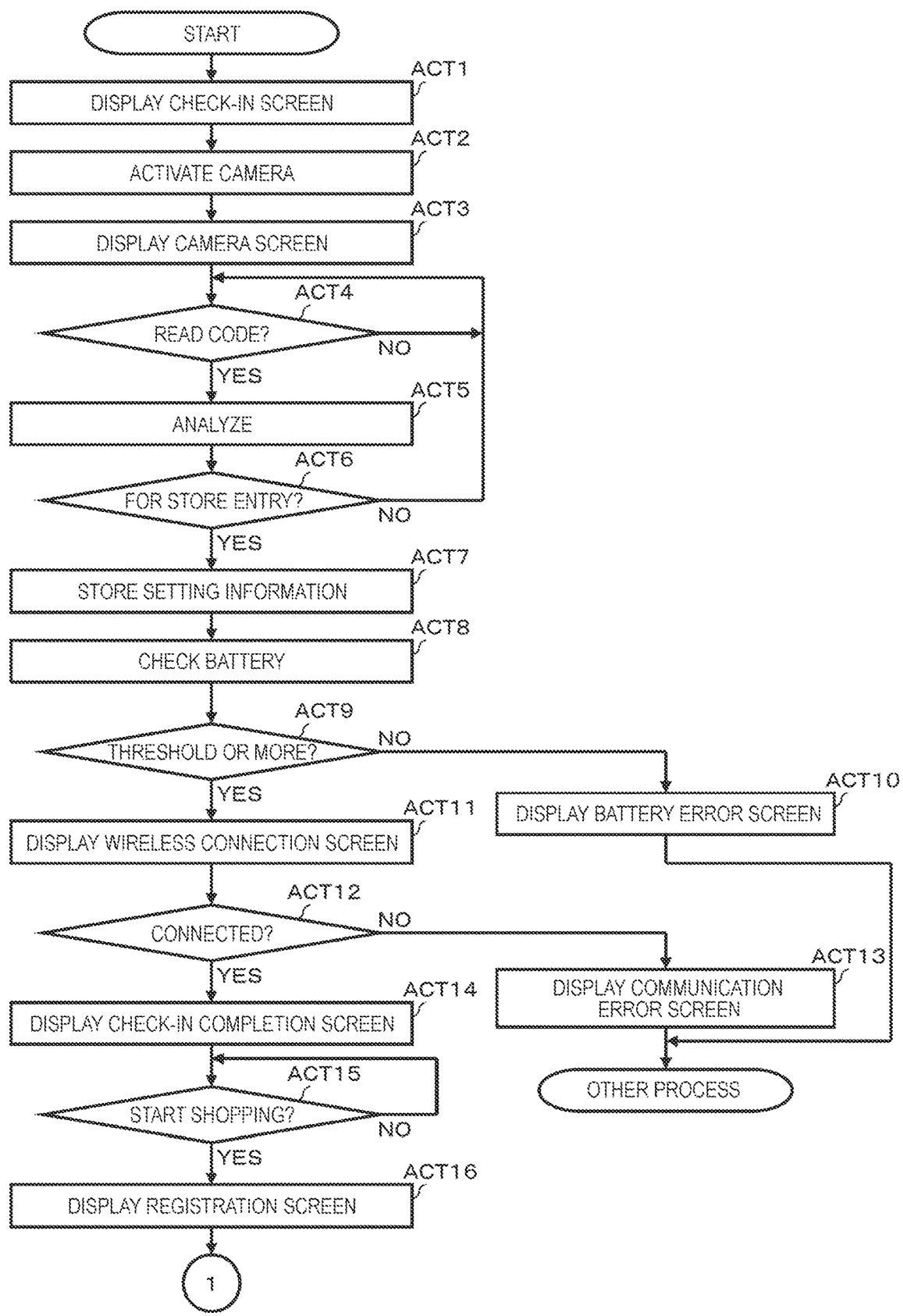
FIG. 4 is a flowchart of information processing executed by the user terminal.
Figure 5:
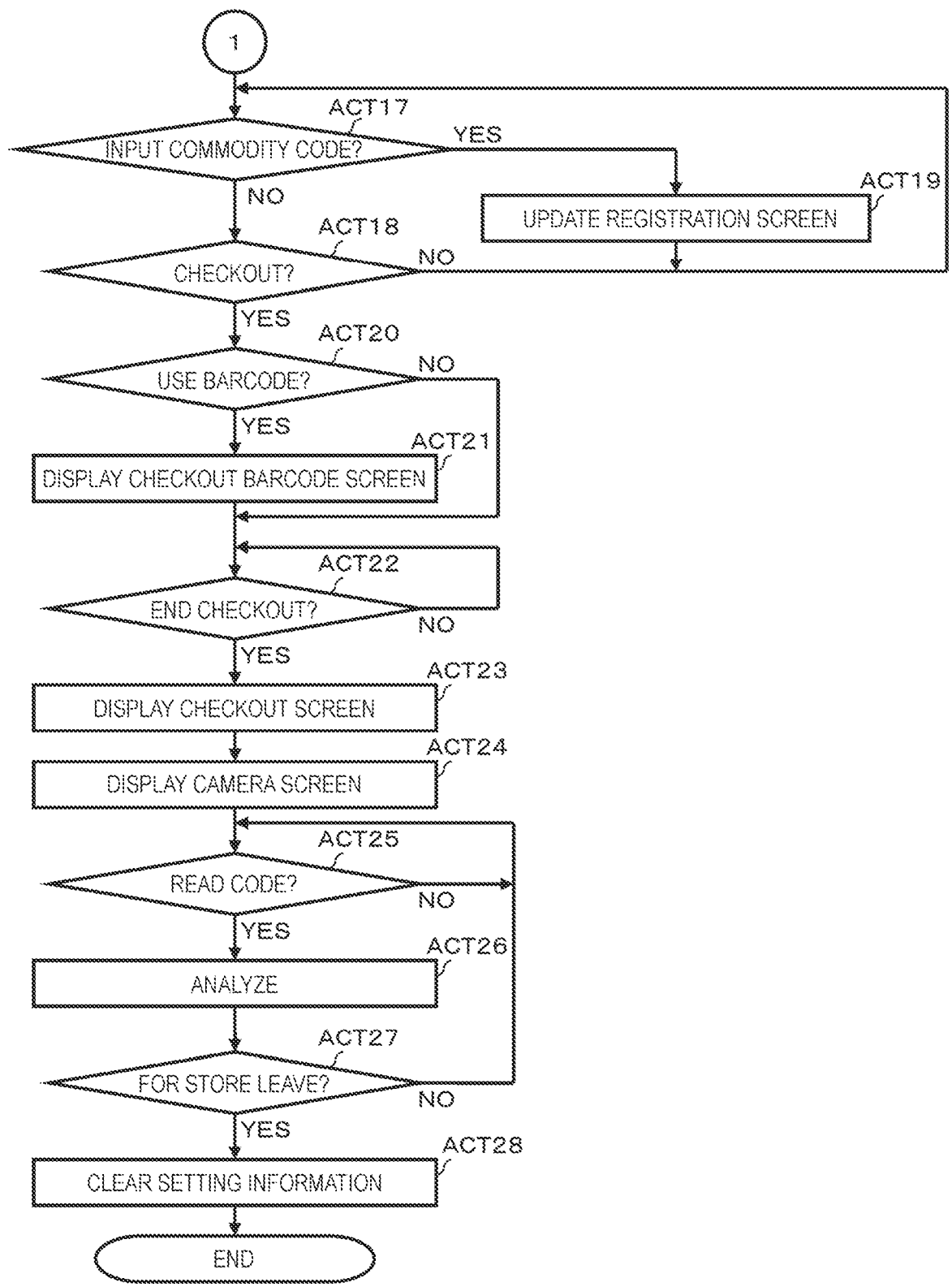
FIG. 5 is a flowchart of information processing executed by the user terminal.

FIGS. 4 and 5 are flowcharts of information processing executed by the processor 41 of the user terminal 40 based on the shopping support program. FIGS. 6 to 16 are schematic diagrams illustrating various screens displayed on the touch panel 44 of the user terminal 40. Hereinafter, main operations of the user terminal 40 will be described with reference to these drawings. The operation description will clarify the shopping support method for the user terminal 40 that stores the shopping support program that operates during shopping at a plurality of stores. The operation described below is an example. Additional or alternative operation procedure may be performed as long as similar results can be obtained.

When the customer goes to a store where the shopping support system 1 has been introduced, for example, the store AAA, the customer starts the shopping support program installed in the user terminal 40 before starting shopping. Then, the processor 41 starts information processing of the procedure shown in the flowcharts of FIGS. 4 and 5.

First, the processor 41 controls the touch panel 44 to display a check-in screen SC1 (see FIG. 6) (ACT1).

Figure 6:
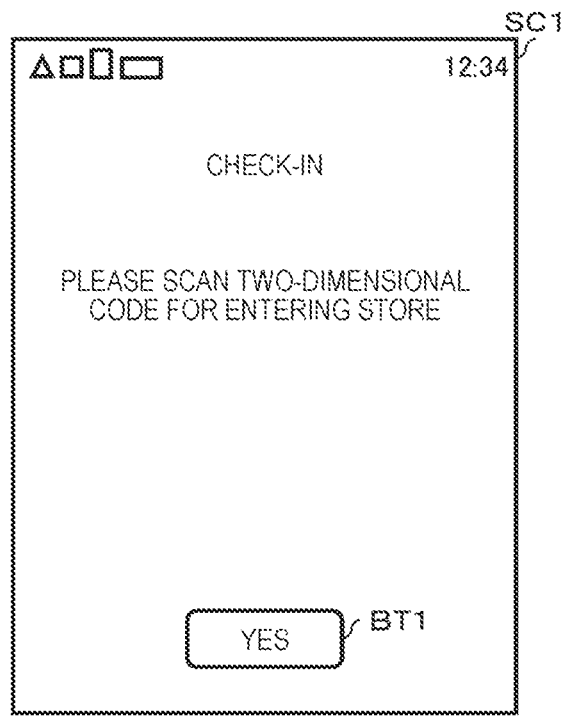
FIG. 6 is a schematic diagram showing a check-in screen displayed on the user terminal.

FIG. 6 is an example of the check-in screen SC1. As shown in FIG. 6, the check-in screen SC1 displays a message instructing to scan a two-dimensional code for store entry, and an image of a "Yes" button BT1. The customer who has confirmed the check-in screen SC1 touches the "Yes" button BT1.

When the processor 41 detects that the "Yes" button BT1 on the check-in screen SC1 has been touched by a signal from the touch panel 44, the processor 41 activates the camera 45 (ACT2). Then, the processor 41 controls the touch panel 44 to display a camera screen SC2 (see FIG. 7) (ACT3).

Figure 7:
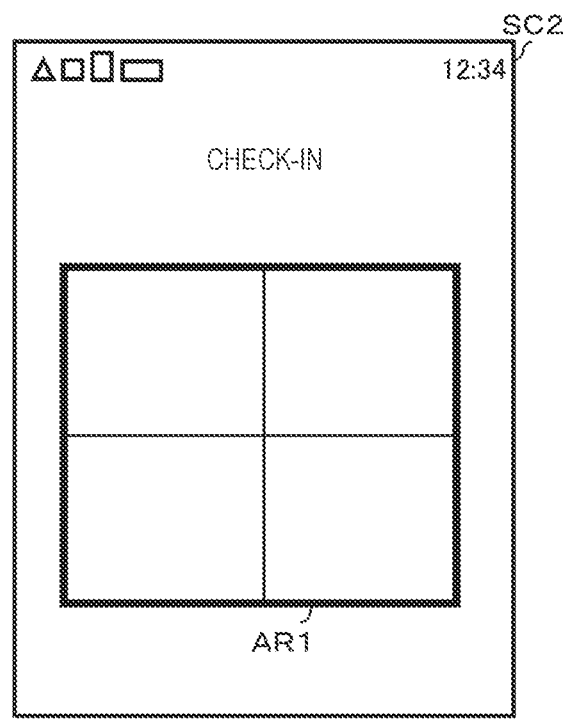
FIG. 7 is a schematic diagram showing a camera screen displayed on the user terminal.

FIG. 7 is an example of the camera screen SC2. As shown in FIG. 7, an image AR1 indicating a two-dimensional code reading area is displayed on the camera screen SC2. The customer who checked the camera screen SC2 moves the user terminal 40 over the data code 50 so that the data code 50 presented at the entrance of the store AAA fits in the image AR1.

Figure 8:
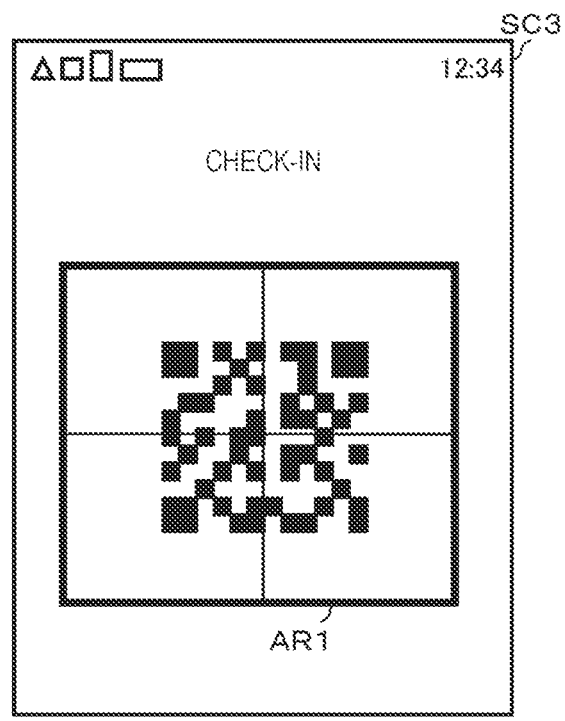
FIG. 8 is a schematic diagram showing a camera screen displayed on the user terminal.

The processor 41 that has displayed the camera screen SC2 waits for the camera 45 to read the data code (ACT4). As shown in FIG. 8, when the data code 50 fits within the image AR1, the processor 41 determines that the data code 50 can be read. The processor 41 determines YES in ACT4, and proceeds to ACT5.

The processor 41 analyzes encoded data from the image of the data code 50 captured by the camera 45 (ACT5). Then, the processor 41 determines whether the read data code is the data code 50 including the store entry flag set to "1" (ACT6).

If the data code 50 read by the camera 45 including the store entry flag of "0" or an incompatible data code is read, the processor 41 determines NO in ACT6, and returns to ACT4. The processor 41 waits for the camera 45 to read the two-dimensional data code, again.

When the data code read by the camera 45 is the data code 50 indicating the store entry flag of "1", the processor 41 determines YES in ACT6 and proceeds to ACT7. In ACT7, the processor 41 stores the data obtained by analyzing the data code 50, that is, the setting data of the setting items corresponding to the serial numbers No. 1 to No. 34, in the third field F3 of the store setting table 60.

When the setting data of each setting item is stored in the store setting table 60 in this way, the processor 41 obtains the data of the third field F3 for the setting item "battery check threshold" of the serial number No. 34, that is, the battery check threshold (ACT8). Then, the processor 41 checks whether the remaining battery level of the battery 49 of the user terminal 40 is equal to or more than the battery check threshold (ACT9).

If the remaining battery level is less than the battery check threshold, the processor 41 determines NO in ACT9 and proceeds to ACT10. The processor 41 controls the touch panel 44 to display a battery error screen SC4 (see FIG. 9) (ACT10).

Figure 9:
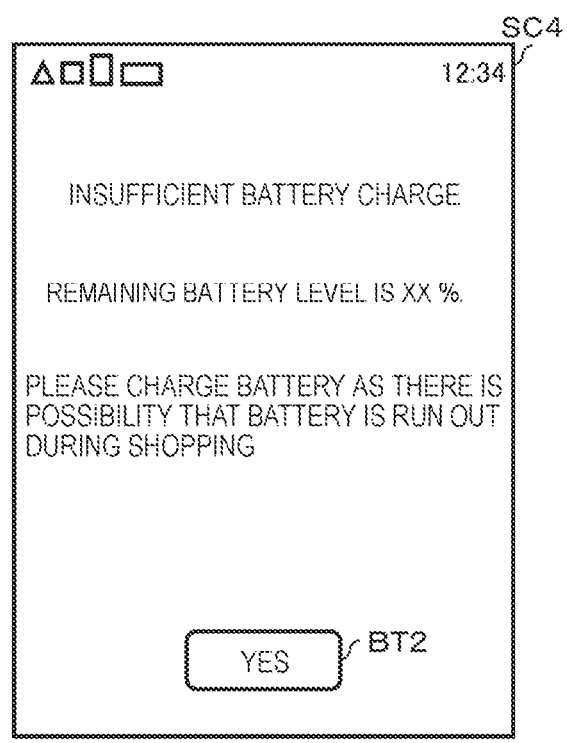
FIG. 9 is a schematic diagram showing a battery error screen displayed on the user terminal.

FIG. 9 is an example of the battery error screen SC4. As shown in FIG. 9, the battery error screen SC4 displays a message urging the customer to charge the battery and an image of a "Yes" button BT2. The customer who checked the battery error screen SC4 touches the "Yes" button BT2. When the processor 41 detects that the "Yes" button BT2 on the battery error screen SC4 has been touched by a signal from the touch panel 44, the processor 41 proceeds to another process. The description of the other process is omitted.

If the processor 41 has confirmed that the remaining battery level is equal to or more than the battery check threshold, the processor 41 determines YES in ACT9 and proceeds to ACT11. The processor 41 controls the touch panel 44 to display a wireless connection screen SC5 (see FIG. 10) (ACT11).

Figure 10:
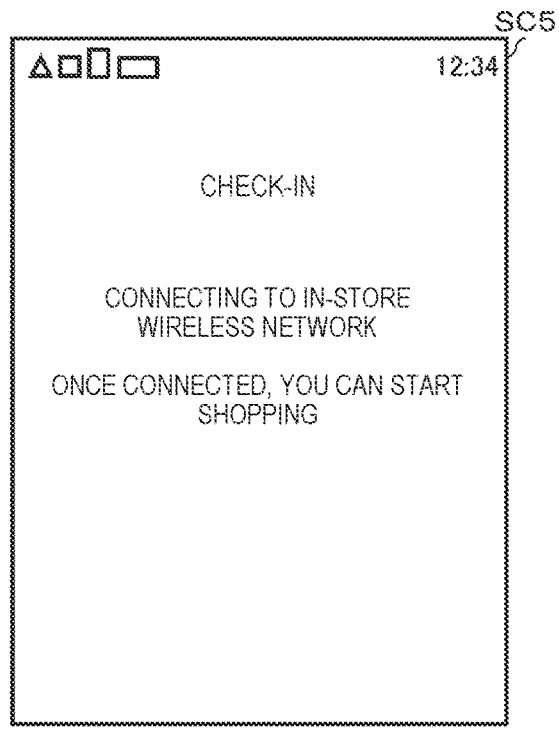
FIG. 10 is a schematic diagram showing a wireless connection screen displayed on the user terminal.

FIG. 10 is an example of the wireless connection screen SC5. As shown in FIG. 10, the wireless connection screen SC5 displays a message indicating that the user terminal 40 is connecting to the in-store wireless network, and that the customer can start shopping when the connection has been established. The customer waits for the user terminal 40 to be connected to the in-store wireless network.

As ACT12, the processor 41 controls the wireless unit 46 to connect to the in-store wireless network using various data of the setting items, e.g., "in-store LAN (SSID)", "in-store LAN (password)", and "in-store LAN (security method)" associated with the serial numbers No. 11 to No. 13 of the store setting table 60. Here, when the connection could not be established with the in-store wireless network even after the time corresponding to the setting data of the setting item "mobile communication timeout period" associated with the serial number No. 23 has elapsed, the processor 41 retries to establish the connection up to the number of times corresponding to the setting data of the setting item "number of mobile communication retries" associated with the serial number No. 24. Then, when the connection to the in-store wireless network could not be established even after the retries, the processor 41 determines NO in ACT12 and proceeds to ACT13. The processor 41 controls the touch panel 44 to display a communication error screen SC6 (see FIG. 11) (ACT13).

Figure 11:
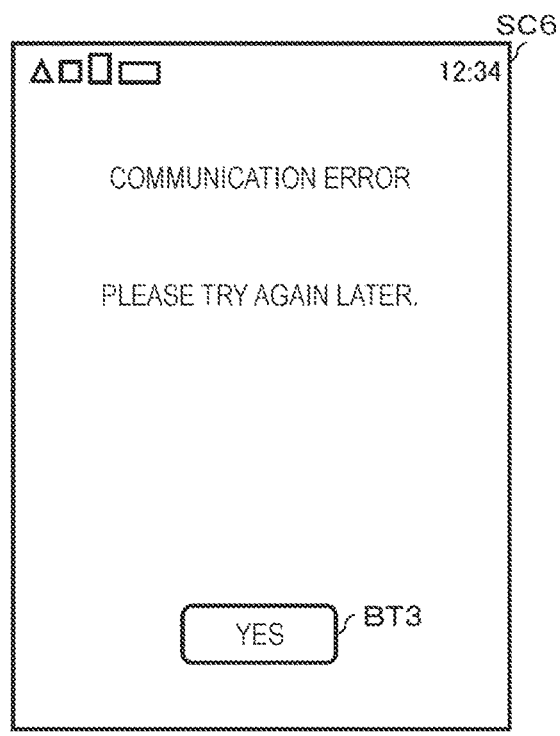
FIG. 11 is a schematic diagram showing a communication error screen displayed on the user terminal.

FIG. 11 is an example of the communication error screen SC6. As shown in FIG. 11, the communication error screen SC6 displays a message asking the customer to try again later due to a communication error, and an image of a "Yes" button BT3. The customer who has confirmed the communication error screen SC6 touches the "Yes" button BT3. When the processor 41 detects that the "Yes" button BT3 on the communication error screen SC6 has been touched by a signal from the touch panel 44, the processor 41 proceeds to another process. The description of the other process is omitted.

When confirming that the user terminal 40 has been connected to the in-store wireless network, the processor 41 determines YES in ACT12 and proceeds to ACT14. The processor 41 controls the touch panel 44 to display a check-in completion screen SC7 (see FIG. 12) (ACT14).

Figure 12:
FIG. 12 is a schematic diagram showing a check-in completion screen displayed on the user terminal.

FIG. 12 is an example of the check-in completion screen SC7. As shown in FIG. 12, the check-in completion screen SC7 displays a message indicating that the preparation for shopping is completed and an image of a "Yes" button BT4. The customer who has confirmed the check-in completion screen SC7 touches the "Yes" button BT4.

When the user terminal 40 is connected to the in-store wireless network, the store server 11 of the store system 10 acquires a unique terminal ID from the user terminal 40. The store server 11 also acquires the data of the setting item "company code" associated with the serial number No. 2 in the store setting table 60 of the user terminal 40 and the data of the setting item "store code" associated with the serial number No. 3. Then, the store server 11 checks whether the company code and store code that have been preset to the store server 11 match the "company code" and "store code" acquired from the user terminal 40, respectively. If those codes are identical, the store server 11 notifies the virtual POS server 12 of the unique terminal ID of the user terminal 40. The virtual POS server 12 creates a commodity registration table in which the terminal ID notified from the store server 11 is set. The store server 11 wirelessly transmits a check-in completion command to the user terminal 40. In response to the check-in completion command, the processor 41 of the user terminal 40 controls the touch panel 44 to display the check-in completion screen SC7.

After the check-in completion screen SC7 has been displayed, the processor 41 waits for an instruction to start shopping (ACT15). When the processor 41 detects that the "Yes" button BT4 of the check-in completion screen SC7 has been touched by a signal from the touch panel 44, the processor 41 determines that the start of shopping has been instructed. The processor 41 determines YES in ACT15, and proceeds to ACT16. The processor 41 controls touch panel 44 to display a registration screen SC8 (see FIG. 13) (ACT16).

Figure 13:
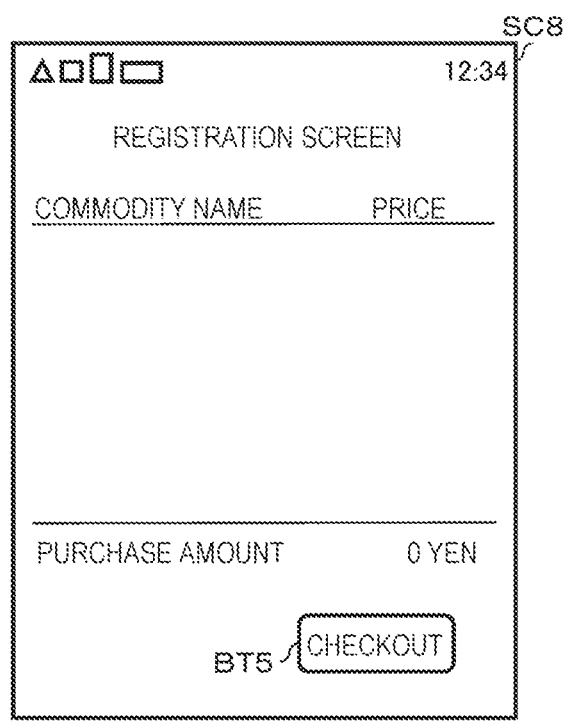
FIG. 13 is a schematic diagram showing a registration screen displayed on the user terminal.

FIG. 13 is an example of the registration screen SC8. As shown in FIG. 13, on the registration screen SC8, an area for displaying the commodity name and price of a commodity and the purchase amount is displayed. An image of a checkout button BT5 for instructing checkout is also displayed. The customer moves and holds the user terminal 40 over a barcode attached to a commodity when storing the commodity in a shopping basket or a shopping cart. Then, the barcode is scanned by the camera 45. The barcode indicates the commodity code of the commodity.

The processor 41 that has controlled the touch panel 44 to display the registration screen SC8 confirms whether a commodity code is input (ACT17 in FIG. 5). If a commodity code is not input, the processor 41 determines NO in ACT17 and proceeds to ACT18. The processor 41 checks whether the checkout button BT5 is touched (ACT18). If the checkout button BT5 is not touched, the processor 41 determines NO in ACT18 and returns to ACT17. Here, the processor 41 waits for the input of the commodity code or the input of the checkout button BT5 in ACT17 and ACT18.

In the standby state of ACT17 and ACT18, when the barcode is scanned by the camera 45 and a commodity code is input from the barcode data, the processor 41 determines YES in ACT17 and proceeds to ACT19. The processor 41 updates the registration screen SC8 (ACT19).

Specifically, the processor 41 transmits the commodity code to the store system 10 using wireless communication. At this time, if the setting data of the setting item "in-store LAN flag" associated with the serial number No. 10 in the store setting table 60 is "1", the processor 41 controls the wireless unit 46 to transmit the data of the commodity code to the store system 10 via the in-store wireless network. In such a case, the data of the commodity code is received by the access point 15 and then acquired by the virtual POS server 12.

On the other hand, if the setting data of the setting item "in-store LAN flag" is "0", the processor 41 controls the communication interface 47 to transmit the data of the commodity code to the store system 10 via the relay server 20. In such a case, the data of the commodity code is received by the communication server 13 and then acquired by the virtual POS server 12.

The virtual POS server 12 then acquires the commodity data such as the commodity name and the price of the commodity specified by the commodity code from the commodity database of the store server 11. Alternatively, the commodity data may be acquired from a local commodity database obtained by copying the commodity database of the store server 11 to the virtual POS server 12. The virtual POS server 12 generates sales data of the commodity based on the obtained commodity data, and registers the sales data in the commodity registration table in which the terminal ID of the user terminal 40 is set. The virtual POS server 12 generates data of the registration screen SC8 based on the data registered in the commodity registration table, and transmits the data to the user terminal 40. In such a case, the data of the registration screen SC8 is transmitted via the access point 15 when the setting data of the setting item "in-store LAN flag" is "1", and the data of the registration screen SC8 is transmitted to the user terminal via the relay server 20 when the setting data of the setting item "in-store LAN flag" is "0". Thus, the processor 41 of the user terminal 40 controls the touch panel 44 to update the registration screen SC8.

Figure 14:
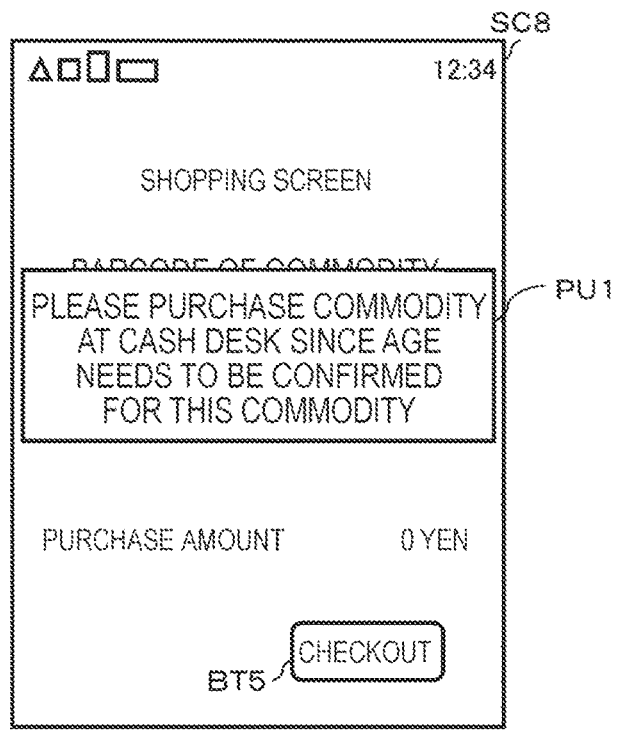
FIG. 14 is a schematic diagram showing a pop-up image displayed over the registration screen.

Meanwhile, when the purchased commodity is an adult commodity, the processor 41 performs a process according to the data of the setting item associated with the serial number No. 31, that is, the compulsory flag for adult commodities. Specifically, when the compulsory flag for adult commodities is "0", the processor 41 controls the touch panel 44 to display a pop-up message PU1 indicating prohibition of the registration of the adult commodities over the registration screen SC8 as shown in FIG. 14. If the compulsory flag for adult commodities is "1", such a pop-up message PU1 is not shown. The virtual POS server 12 may control whether to display the pop-up message PU1.

After completing the shopping, the customer touches the checkout button BT5 on the registration screen SC8. When the processor 41 detects that the checkout button BT5 has been touched by a signal from the touch panel 44, the processor 41 determines YES in ACT18 and proceeds to ACT20. The processor 41 performs a process according to the data of the setting item "checkout machine transfer mode" associated with the serial number No. 29, as ACT20. That is, in the case of using the checkout barcode linked to the checkout data, the processor 41 determines YES in ACT20 and proceeds to ACT21. The processor 41 controls the touch panel 44 to display a checkout barcode screen SC9 (see FIG. 15) (ACT21).

Figure 15:
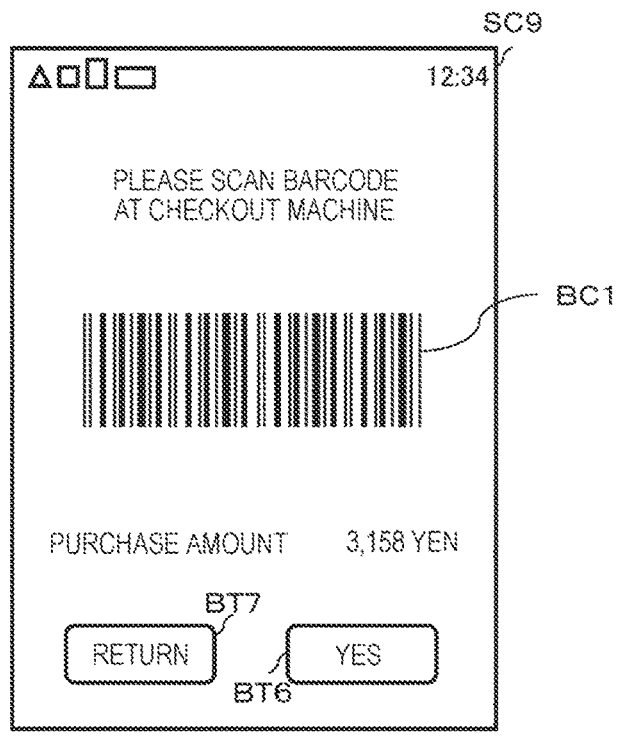
FIG. 15 is a schematic diagram showing a checkout barcode screen displayed on the user terminal.

FIG. 15 is an example of the checkout barcode screen SC9. As shown in FIG. 15, the checkout barcode screen SC9 includes a checkout barcode BC1 and a message urging the checkout barcode to be scanned with the checkout machine. On the checkout bar code screen SC9, an image of a "Yes" button BT6 for indicating that the customer confirmed the message and a "Return" button BT7 for instructing return to shopping are displayed.

The checkout barcode BC1 is generated by the virtual POS server 12. That is, the virtual POS server 12 generates a unique checkout code in association with the commodity registration table in which the terminal ID of the user terminal 40 by which the checkout has been instructed is set. The virtual POS server 12 generates the checkout barcode BC1 including the checkout code, and transmits the generated checkout barcode BC1 to the user terminal 40 by which the checkout has been instructed. Thus, a checkout barcode screen SC9 is displayed on the touch panel 44 of the user terminal 40.

The customer who has confirmed the checkout barcode screen SC9 touches the "Yes" button BT6. Then, the customer goes to the place where the checkout machine 14 is installed, and causes the scanner of a vacant checkout machine 14 to read the checkout barcode BC1. When the checkout barcode is read by the checkout machine 14, the data of the commodity registration table associated with the checkout code included in the checkout barcode BC1 is sent from the virtual POS server 12 to the checkout machine 14 via the store server 11. Thus, in the checkout machine 14, the purchased commodity is settled by various settlement methods. When the settlement of the purchased commodity is completed, a checkout end command is transmitted from the virtual POS server 12 to the user terminal 40.

The processor 41 that has displayed the checkout barcode screen SC9 waits for the checkout end command (ACT22). In this standby state, when the processor 41 confirms that the "return" button has been touched, the processor 41 controls the touch panel 44 to display the immediately preceding registration screen SC8 and returns to the process of ACT17.

When receiving the checkout end command via the wireless unit 46 or the communication interface 47, the processor 41 determines YES in ACT22 and proceeds to ACT23. The processor 41 controls the touch panel 44 to display a checkout screen SC10 (see FIG. 16) (ACT23).

Figure 16:
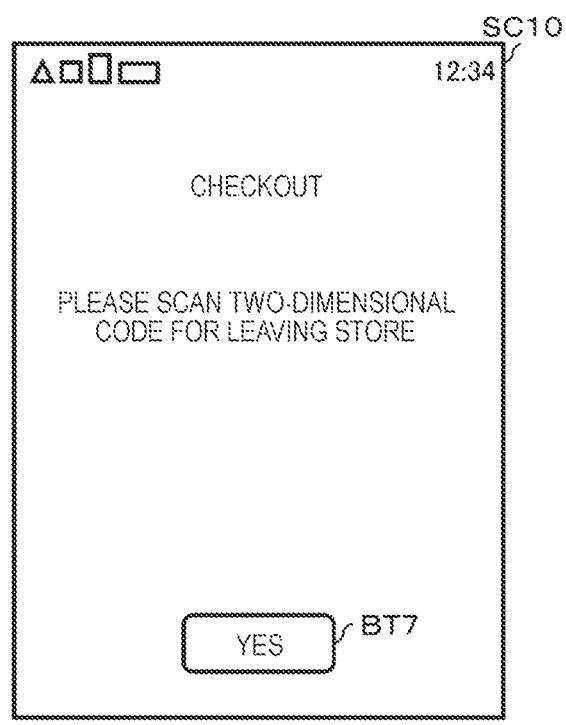
FIG. 16 is a schematic diagram showing a checkout screen displayed on the user terminal.

FIG. 16 is an example of the checkout screen SC10. As shown in FIG. 16, the checkout screen SC10 displays a message instructing to scan a two-dimensional code for leaving the store and an image of the "Yes" button BT7. The customer who has confirmed the checkout screen SC10 touches the "Yes" button BT7.

When the processor 41 detects that the "Yes" button BT7 of the checkout screen SC10 has been touched by a signal from the touch panel 44, the processor 41 controls the touch panel 44 to display the camera screen SC2 (see FIG. 7) (ACT24). The customer who has confirmed the camera screen SC2 moves and holds the user terminal 40 over the data code 50 so that the data code 50 presented at the exit of the store AAA fits in the image AR1.

After the camera screen SC2 has been displayed, the processor 41 waits for the camera 45 to read the two-dimensional data code 50 (ACT25). As shown in FIG. 8, when the data code 50 fits within the image AR1, the processor 41 determines that the data code can be read. The processor 41 determines YES in ACT25, and proceeds to ACT26.

The processor 41 analyzes encoded data from the data code image captured by the camera 45 (ACT26). Then, the processor 41 determines whether the read data code is the data code 50 for setting the store entry flag to "0" (ACT27).

If the data code read by the camera 45 is the data code 50 for entering the store with the store entry flag of "1" is read, or an incompatible data code, the processor 41 determines NO in ACT27 and returns to ACT25. The processor 41 waits for the camera 45 to read the two-dimensional data code, again.

If the data code read by the camera 45 is the data code 50 for leaving the store with the store entry flag of "0", the processor 41 determines YES in ACT27 and proceeds to ACT28. The processor 41 clears the setting data stored in the third field F3 of the store setting table 60 (ACT28). As described above, the processor 41 ends the information processing according to the shopping support program.

Here, the processor 41 of the user terminal 40 executes the processes of ACT1 to ACT6 according to the shopping support program. That is, the processor 41 detects a customer's entrance into a store by acquiring the data code 50 whose store entry flag is "1", and acquires store-specific setting information from the data code 50.

The processor 41 executes the process of ACTT to store the store setting table 60. That is, the processor 41 stores the store-specific setting information in the store setting table 60 of the user terminal 40.

The processor 41 executes the processes of ACT8 to ACT21. That is, the processor 41 executes the shopping support program based on the store-specific setting information stored in the store setting table 60.

For example, the processor 41 performs a battery check of the user terminal 40 based on the information of the battery check threshold, and control the touch panel 44 to display the battery error screen SC4 when the remaining battery level of the battery 49 is less than the battery check threshold, thereby restricting the use of the user terminal 40.

For example, the processor 41 controls the wireless unit 46 to establish a wireless connection with the store system 10 based on information such as the SSID of the in-store LAN, a password, a security method, a timeout period of mobile communication, and the number of retries. If the connection fails, the processor 41 controls the touch panel 44 to display the communication error screen SC6, thereby restricting the use of the user terminal 40.

On the other hand, when the connection has been established successfully, the processor 41 control the touch panel 40 to display the check-in completion screen SC7 and allows the use of the user terminal 40 for the customer to start shopping. Then, the processor 41 cooperates with the virtual POS server 12 to execute processing relating to self-service registration and settlement of the commodity in the shopping support system 1.

As described above, according to the embodiments, the customer only needs to perform an operation for reading the data code 50 presented at the entrance of the store using the user terminal 40 before starting shopping at the store. Thereby, different information for each store or each company that operates the store can be set in the user terminal 40. Therefore, even when a communication terminal such as a personally owned smartphone is used as the user terminal 40, a complicated setting operation is not required. Thus, it is possible to provide a shopping support system using a personally owned communication terminal as a user terminal without requiring complicated setting operations.

When the shopping is completed in one store, the customer performs an operation for reading the data code 50 for leaving the store presented at the exist of the store using the user terminal 40. Then, the store-specific setting information stored in the store setting table 60 is cleared. Therefore, since information unique to the store or the company does not remain in the user terminal 40 indefinitely, there is no concern for security.

In the above-described embodiments, the user terminal 40 stores the store setting table 60. However, the store setting table 60 does not necessarily have to be stored in the user terminal 40. For example, the relay server 20 may store the store setting table 60 for the operating user terminal 40. In such a case, the user terminal 40 transmits the setting information obtained from the data code 50 to the relay server 20. Therefore, the storage unit is provided in the relay server 20. In such a case, the user terminal 40 executes the shopping support program in accordance with a command from the relay server 20. Therefore, a control unit having a processor and a memory is also provided in cooperation with the relay server 20.

In the aforementioned embodiments, the data code 50 is used for the user terminal 40 to obtain the data of each setting item described in the third field F3 of the store setting table 60. However, any method may be used to obtain such data. For example, when the user terminal 40 has a non-contact IC card reader, an antenna for short-range wireless communication is arranged in each store, and the user terminal 40 may acquire data of each setting item by non-contact wireless communication.

In the above-described embodiments, the data of the third field F3 of the store setting table 60 is cleared by reading the data code 50 for leaving the store with the camera 45 of the user terminal 40. Alternatively, the data may be cleared automatically when the completion of the checkout is recognized in ACT21 of FIG. 5. By doing so, possibilities for the customer to struggle with the operations to read the data code 50 for leaving the store can be eliminated.

In the embodiments, the setting items of the store setting table 60 are set to 34 types. However, other setting items may be added. Alternatively, any setting item may be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping support device connectable to a point-of-sale (POS) server via a store network of a store, comprising:
   a touch panel;
   a memory;
   a camera;
   a network interface; and
   a processor configured to:
     generate a first screen to be displayed on the touch panel and through which a user can check in at the store,
     acquire first and second parameter values from a first code presented at the store while the first screen is displayed, and store the first and second parameter values in the memory,
     control the network interface to connect to the store network using the first parameter value,
     after a connection to the store network is established, generate a second screen to be displayed on the touch panel for registering a commodity for purchase, the second screen including a button to proceed to checkout processing,
     upon reading of a commodity ID for a commodity with the camera while the second screen is displayed, control the network interface to transmit the commodity ID via the store network to the POS server for registration, and
     in response to an operation on the button of the second screen, perform checkout processing using the commodity ID registered by the POS server and the second parameter value, wherein the second parameter value indicates whether the store accepts an electronic payment method using a barcode or a two-dimensional code.

2. The shopping support device according to claim 1, wherein the first parameter value is a network parameter value required to connect to the store network.

3. The shopping support device according to claim 1, wherein the processor is configured to, upon reading of a commodity ID of a particular commodity type with the camera, wait for an input of a second code via the camera before transmitting the commodity ID for registration.

4. The shopping support device according to claim 1, wherein the processor is configured to:
   acquire a third parameter value, and
   upon reading of a commodity ID of a particular commodity type with the camera, wait for an input of a second code corresponding to the third parameter value via the camera before transmitting the commodity ID for registration.

5. The shopping support device according to claim 4, wherein the processor is configured to generate a third screen to be displayed on the display when the processor is waiting for an input of the second code, the third screen instructing the user to register the commodity at a checkout counter in the store.

6. The shopping support device according to claim 1, wherein the processor is configured to:
   acquire a battery level threshold value,
   check a battery level of the shopping support device, and
   if the battery level is below the battery level threshold value, generate a fourth screen to be displayed on the display, the fourth screen instructing to the user to charge the battery.

7. The shopping support device according to claim 1, wherein the processor is configured to delete the first and second parameters from the memory after the checkout processing has been performed.

8. The shopping support device according to claim 1, wherein the processor is configured to acquire a fourth parameter value indicating a network address to which an electronic receipt is transmitted after checkout processing has been performed.

9. A point-of-sale (POS) system operated in a store, comprising:
   a POS server connected to a store network of the store; and
   a shopping support device including:
     a touch panel,
     a memory,
     a camera,
     a network interface, and
     a processor configured to:
       generate a first screen to be displayed on the touch panel and through which a user can check in at the store,
       acquire first and second parameter values from a first code presented at the store while the first screen is displayed, and store the first and second parameter values in the memory,
       control the network interface to connect to the store network using the first parameter value,
       after a connection to the store network is established, generate a second screen to be displayed on the touch panel for registering a commodity for purchase, the second screen including a button to proceed to checkout processing,
       upon reading of a commodity ID for a commodity with the camera while the second screen is displayed, control the network interface to transmit the commodity ID via the store network to the POS server for registration, and
       in response to an operation on the button of the second screen, perform checkout processing using the commodity ID registered by the POS server and the second parameter value, wherein the second parameter value indicates whether the store accepts an electronic payment method using a barcode or a two-dimensional code.

10. The POS system according to claim 9, wherein the first parameter value is a network parameter value required to connect to the store network.

11. The POS system according to claim 9, wherein the processor is configured to, upon reading of a commodity ID of a particular commodity type with the camera, wait for an input of a second code via the camera before transmitting the commodity ID for registration.

12. The POS system according to claim 9, wherein the processor is configured to:
   acquire a third parameter value, and
   upon reading of a commodity ID of a particular commodity type with the camera, wait for an input of a second code corresponding to the third parameter value via the camera before transmitting the commodity ID for registration.

13. The POS system according to claim 12, wherein the processor is configured to generate a third screen to be displayed on the display when the processor is waiting for an input of the second code, the third screen instructing the user to register the commodity at a checkout counter in the store.

14. The POS system according to claim 9, wherein the processor is configured to:
   acquire a battery level threshold value,
   check a battery level of the shopping support device, and
   if the battery level is below the battery level threshold value, generate a fourth screen to be displayed on the display, the fourth screen instructing to the user to charge the battery.

15. The POS system according to claim 9, wherein the processor is configured to delete the first and second parameters from the memory after the checkout processing has been performed.

16. The POS system according to claim 9, wherein the processor is configured to acquire a fourth parameter value indicating a network address to which an electronic receipt is transmitted after checkout processing has been performed.

17. A shopping support method carried out by a shopping support device connectable to a point-of-sale (POS) server via a store network of a store, the method comprising:
   generating a first screen to be displayed on a touch panel and through which a user can check in at the store;
   acquiring first and second parameter values from a first code presented at the store while the first screen is displayed, and storing the first and second parameter values in a memory;
   connecting to the store network using the first parameter value;
   after a connection to the store network is established, generating a second screen to be displayed on the touch panel for registering a commodity for purchase, the second screen including a button to proceed to checkout processing;
   upon reading of a commodity ID for a commodity with the camera while the second screen is displayed, transmitting the commodity ID via the store network to the POS server for registration; and
   in response to an operation on the button of the second screen, performing checkout processing using the commodity ID registered by the POS server and the second parameter value, wherein the second parameter value indicates whether the store accepts an electronic payment method using a barcode or a two-dimensional code.

* * * * *